United States Patent
Matsunaga et al.

(10) Patent No.: US 7,143,875 B2
(45) Date of Patent: Dec. 5, 2006

(54) ATTENUATION COEFFICIENT SWITCHING TYPE HYDRAULIC DAMPER

(75) Inventors: Yoshinori Matsunaga, Tokyo (JP); Haruhiko Kurino, Tokyo (JP)

(73) Assignee: Kajima Corporation, Tokyo (JP)

( * ) Notice: Subject to any disclaimer, the term of this patent is extended or adjusted under 35 U.S.C. 154(b) by 0 days.

(21) Appl. No.: 10/485,894

(22) PCT Filed: Feb. 5, 2003

(86) PCT No.: PCT/JP03/01170

§ 371 (c)(1),
(2), (4) Date: Sep. 2, 2004

(87) PCT Pub. No.: WO2004/070230

PCT Pub. Date: Aug. 19, 2004

(65) Prior Publication Data

US 2005/0016086 A1  Jan. 27, 2005

(51) Int. Cl.
*F16F 9/34* (2006.01)
(52) U.S. Cl. ............ 188/266.5; 188/312; 188/313; 267/64.28; 251/250
(58) Field of Classification Search ............ 188/266.2, 188/266.5, 284.4, 312, 313, 314, 315; 267/64.28; 251/250, 279, 280
See application file for complete search history.

(56) References Cited

U.S. PATENT DOCUMENTS

| | | | |
|---|---|---|---|
| 3,561,574 A | * | 2/1971 | Dickinson et al. .......... 188/280 |
| 4,084,668 A | * | 4/1978 | Rybicki ....................... 188/312 |
| 4,597,556 A | * | 7/1986 | Sandling ....................... 251/58 |
| 5,147,018 A | * | 9/1992 | Kobori et al. ............... 188/300 |
| 5,558,190 A | * | 9/1996 | Chang ........................ 188/312 |

FOREIGN PATENT DOCUMENTS

| | | |
|---|---|---|
| JP | 08-260746 | 10/1996 |
| JP | 08-303050 | 11/1996 |
| JP | 09-072126 | 3/1997 |
| JP | 11-336366 | 12/1999 |
| JP | 11336366 | * 12/1999 |
| JP | 2002-054675 | 2/2002 |

* cited by examiner

*Primary Examiner*—Devon Kramer
(74) *Attorney, Agent, or Firm*—Pearne & Gordon LLP

(57) ABSTRACT

A hydraulic damper used for reducing shaking of a structure, for example in an earthquake. The hydraulic damper has a cylinder, a piston movable in a reciprocating manner within the cylinder, hydraulic chambers at opposite sides of the piston, and a single on-off control valve. There is a passage for connecting both of the hydraulic chambers and is on-off controlled to change a damping coefficient. A damping coefficient switching-type hydraulic damper is provided between a piston rod and the on-off control valve. A first damping coefficient is attained when the on-off control valve is maintained in a closed state for movement of said piston in one direction, and a second damping coefficient is attained when the on-off control valve is opened. A mechanical drive for the control valve may be a straight gear operatively attached to the piston rod of the cylinder, and a crank mechanism that works with the straight gear to on-off control the control valve.

3 Claims, 11 Drawing Sheets

PRIOR ART     PRIOR ART

PRIOR ART

ATTENUATION COEFFICIENT SWITCHING TYPE HYDRAULIC DAMPER

TECHNICAL FIELD

This invention relates to a hydraulic damper useful in reducing shaking of a structure (such as buildings, bridges and roofs) in response to vibrations and/or external forces such as earthquake and wind.

BACKGROUND ART

As one of damper-type seismic response control devices useful in reducing shaking of a structure, there is a variable damping device (as disclosed in Japanese Patent Laid-open No. 11-336366, for instance) or the like structured so that a valve opening of an on-off control valve is controllable in two stages so as to be switched between a full open position and a full closed position.

The above hydraulic damper has a basic structure as shown in the prior art drawings of FIGS. 11–14, specifically, includes a cylinder 2, a double rod-type piston 3 movable in a reciprocating manner within the cylinder 2, hydraulic chambers 4, 4 provided at the opposite sides of the piston 3, an on-off control valve 6 provided in a passage 5 for connecting both the hydraulic chambers, and other components. This hydraulic damper causes the on-off control valve (electromagnetic valve) 6 to be on-off controlled in two stages so as to be switched between the full open position and the full closed position with supply of control current from a controller 7, and thereby allows a damping coefficient of a hydraulic damper 1 to be switched in two stages, that is, between a maximum value Cmax and a minimum value Cmin.

Thus-structured hydraulic damper 1 is mounted between stories of a structure through a structural component such as a brace as shown in FIG. 12. Thus, mechanical characteristics of a device part including the brace are represented as Maxwell-type model configured so that a spring and a dashpot are joined in series as shown in FIG. 13.

The device of FIG. 11 performs large energy absorption as shown in FIG. 14 by switching the damping coefficient of the device, that is, the valve opening of the on-off control valve 6 at a maximum point of amplitude of vibrations, and attains a reduction of vibrations of the structure. In FIG. 14, a load L of the hydraulic damper is scaled at a vertical axis, and a story deformation (deformation between Maxwell-type model ends) δ is scaled at a horizontal axis. In addition, a portion plotted by a broken line represents a result of energy absorption using a conventional damper $D_0$ whose damping coefficient is constant, while a portion plotted by a solid line represents a result of energy absorption using a damping coefficient switching-type damper $D_1$. Further, control of the valve opening C will do only in two stages so as to be switched between extreme positions such as the full closed position and the full open position. Thus, the device of FIG. 11 may have a more simplified structure as compared with a device (as disclosed in Japanese Patent Publication No. 7-45781, for instance) structured so that the valve opening is variably-controllable in a continuous manner.

However, the conventional device as described above requires an uninterruptible power supply unit and a special-purpose power supply wiring, because of indispensable use of electric components such as a sensor, a controller and an electromagnetic valve. In addition, the above electric components include those needing to be exchanged regularly, so that the above conventional device brings about a need for a cost involving a maintenance cost.

The present invention is conceived in order to solve the above problems, and an object thereof is to provide a variable damping-type hydraulic damper, more specifically, a damping coefficient switching-type hydraulic damper, which may automatically switch a damping coefficient without needing supply of energy from the outside at all, and also may always surely exert an energy absorption capacity greater than that of a typical hydraulic damper.

DISCLOSURE OF THE INVENTION

In a hydraulic damper having a cylinder, a piston movable in a reciprocating manner within the cylinder, hydraulic chambers provided at the opposite sides of the piston and an on-off control valve provided in a passage for connecting both the hydraulic chambers and being on-off controlled to change a damping coefficient, a damping coefficient switching-type hydraulic damper is characterized by being structured so that a first damping coefficient is attained with the on-off control valve maintaining a closed state for a movement of the piston in one direction, and a second damping coefficient is attained with the on-off control valve once opened at the time when the movement of the piston is turned in the opposite direction, and afterwards, is switched to the first damping coefficient with the on-off control valve closed again.

The damping coefficient switching-type hydraulic damper as disclosed is that having a basic structure of the present invention. Specifically, this hydraulic damper is structured so that the damping coefficient of the hydraulic damper may be directly switched by a mechanical means or a hydraulic means without needing supply of energy from the outside. Switching controls the on-off control valve using a mechanical drive means (See FIGS. 1 to 4) or a hydraulic drive means (See FIGS. 5 to 7) that works in response to the movement of the piston of the hydraulic damper. The on-off control valve may be a flow regulating valve 10 that works with an on-off control operation valve 11 shown in FIG. 1, an independent on-off control operation valve 11 or the like, for instance.

In a hydraulic damper having a cylinder, a piston movable in a reciprocating manner within the cylinder, hydraulic chambers provided at the opposite sides of the piston and an on-off control valve provided in a passage for connecting both the hydraulic chambers and being on-off controlled to change a damping coefficient, a damping coefficient switching-type hydraulic damper as defined in claim 2 of the present invention is characterized by providing a mechanical drive means between a piston rod and the on-off control valve, the mechanical drive means being structured so that a first damping coefficient is attained with the on-off control valve maintaining a closed state for a movement of the piston in one direction, and a second damping coefficient is attained with the on-off control valve once opened at the time when the movement of the piston is turned in the opposite direction, and afterwards, is switched to the first damping coefficient with the on-off control valve closed again.

The damping coefficient switching-type hydraulic damper is that employing a mechanical drive means shown in FIG. 2 or 4. Specifically, the hydraulic damper in FIGS. 1 and 2, for instance, employs a mechanical drive means 30 that works with the piston 3 at the time only when a direction of movement of the piston 3 is turned. While the piston 3 is moving in a direction A, the on-off control operation valve 11 and the flow regulating valve 10 are placed in a closed state in such a manner as not to allow the mechanical drive means 30 to work, and the first damping coefficient (maximum value Cmax) is attained. When the movement of the piston 3 is turned in a direction B at a left-side maximum point of amplitude, the mechanical drive means 30 works to once open the on-off control operation valve 11, which then allows the flow regulating valve 10 to be once opened to perform elimination of a load, and the second damping coefficient (minimum value Cmin) is attained. When the piston 3 further moves in the direction B, the mechanical drive means 30 works to close the on-off control operation valve 11 and the flow regulating valve 10 again, and the second damping coefficient is returned to the first damping coefficient (maximum value Cmax). Similar working to the above is also applied to a right-side maximum point of amplitude, and the above operations are performed repeatedly. It is noted that the flow regulating valve 10 is a valve that is used for a case where a flow rate of a hydraulic fluid is high. Alternatively, when the flow rate of the hydraulic fluid is not so high, the on-off control operation valve 11 of the flow regulating valve 10 may be used independently as the on-off control valve.

In the damping coefficient switching-type hydraulic damper of FIGS. 1 and 2, a damping coefficient switching-type hydraulic damper is characterized in that the mechanical drive means for driving the on-off control valve is composed of a straight gear provided at the piston rod of the cylinder and a crank mechanism that works with the straight gear to on-off control the on-off control valve.

The damping coefficient switching-type hydraulic damper is that employing a mechanical drive means restricted to one having a structure shown in FIG. 2 or 4. Once the crank mechanism is set so that a first link at a tip end side thereof is tilted backward to the straight gear, the first link maintains a backward tilting position for a movement of the straight gear in one direction. Then, when a direction of movement of the straight gear is turned, the first link is changed in position to upright.

In the damping coefficient switching-type hydraulic damper, a damping coefficient switching-type hydraulic damper as defined claim 4 of the present invention is characterized by being structured so that pressures in the hydraulic chambers at the opposite sides of the piston are controlled using a single on-off control valve.

The damping coefficient switching-type hydraulic damper 4 is that of single valve type, wherein a single on-off control valve (flow regulating valve 10) is used as shown in FIG. 1, for instance. A crank mechanism 32 does not work for the movement of the piston 3 in the direction A, and therefore, the on-off control operation valve 11 (flow regulating valve 10) maintains a closed state. When the piston 3 starts moving in the direction B, the crank mechanism 32 works to firstly once open the on-off control operation valve 11 (flow regulating valve 10), and secondly return the on-off control operation valve 11 (flow regulating valve 10) to the closed state, so that the closed state thereof is maintained in such a manner as not to allow the crank mechanism 32 to work for the movement of the piston 3 in the direction B.

In the damping coefficient switching-type hydraulic damper as defined in claim 2 or 3, a damping coefficient switching-type hydraulic damper as defined in claim 5 of the present invention is characterized by being structured so that pressures in the hydraulic chambers at the opposite sides of the piston are controlled using independent on-off control valves respectively.

The damping coefficient switching-type hydraulic damper as defined in claim 5 is that of two valve type, wherein two on-off control valves (flow regulating valves 10) are used as shown in FIG. 3, for instance. Specifically, this hydraulic damper employs a mechanical drive means 30' that works with the piston 3 at the time only when a direction of movement of the piston 3 is turned. While the piston 3 is moving in the direction A, the on-off control operation valve 11 is closed to place a left-side flow regulating valve 10 in the closed state in such a manner as not to allow the mechanical drive means 30' to work, and the first damping coefficient (maximum value Cmax) is attained. When the movement of the piston 3 is turned in the direction B at a left-side maximum point of amplitude, the mechanical drive means 30' works to once open the on-off control operation valve 11, which then allows the left-side flow regulating valve 10 to be once opened to perform elimination of a load, and the second damping coefficient (the minimum value Cmin) is attained. In this place, switching of a right-side flow regulating valve 10 (on-off control valve) from the open state to the closed state is already performed, and the closed state thereof is maintained, so that the first damping coefficient (maximum value Cmax) is attained for the movement of the piston 3 in the direction B. Similar working to the above is also applied to a right-side maximum point of amplitude, and the above operations are performed repeatedly. In this case, it is also noted that the on-off control operation valve 11 of the flow regulating valve 10 may be used independently as the on-off control valve when the flow rate is not so high.

Alternatively, the damping coefficient switching-type hydraulic damper comprising the on-off control valve having the above mechanical drive means may further have a relief valve for limiting the pressures in the left- and right-side hydraulic chambers, for instance, in order to prevent a device from being broken due to an unexpected high load applied thereto.

In a hydraulic damper having a cylinder, a piston movable in a reciprocating manner within the cylinder, hydraulic chambers provided at the opposite sides of the piston, and an on-off control valve provided in a passage for connecting both the hydraulic chambers and being on-off controlled to change a damping coefficient, a damping coefficient switching-type hydraulic damper as defined in claim 6 is characterized by providing a hydraulic drive means in a hydraulic circuit of the cylinder, the hydraulic drive means being structured so that a first damping coefficient is attained with the on-off control valve maintaining a closed state at the time when a movement of the piston in one direction causes hydraulic pressure in one hydraulic chamber to increase, and a second damping coefficient is attained with the on-off control valve once opened at the time when the movement of the piston is turned in the opposite direction to cause the above hydraulic pressure to decrease, and afterwards, is switched to the first damping coefficient with the on-off control valve closed again in response to the increasing hydraulic pressure in the other hydraulic chamber.

The damping coefficient switching-type hydraulic damper as defined in claim 6 is that employing a hydraulic drive means as shown in FIG. 5, 6 or 7, for instance. Specifically, this hydraulic damper is that utilizing a change of hydraulic pressure at the time when the direction of movement of the piston is turned.

In the damping coefficient switching-type hydraulic damper as defined in claim 6, a damping coefficient switching-type hydraulic damper as defined in claim 7 of the present invention is characterized in that the hydraulic drive means for driving the on-off control valve is composed of a buffer that communicates with the hydraulic chamber of the cylinder and is used for storing pressure, and a selector valve that works in response to a difference in pressure between the buffer and the hydraulic chamber of the cylinder.

The damping coefficient switching-type hydraulic damper as defined in claim 7 is that employing a hydraulic drive means 40 composed of a buffer 42 used for storing the pressure, and a selector valve 43 for comparing pressure in the buffer 42 with an actual pressure in a passage directly connected with the cylinder chamber and then outputting pilot pressure at the time only when the pressure in the buffer 42 is higher, for instance, as shown in FIG. 5, 6 or 7. In this hydraulic damper, the buffer 42 and the selector valve 43 on the left side work to allow the on-off control operation valve 11 (flow regulating valve 10) to maintain the closed state for the increasing pressure caused by the movement of the piston 3 in the direction A, while once opening the on-off control operation valve 11 (flow regulating valve 10) in response to the decreasing pressure caused by the movement of the piston 3 in the direction B. Then, the buffer 42 and the selector valve 43 on the right side work to switch the on-off control operation valve 11 (flow regulating valve 10) to the closed state, and the closed state thereof is maintained.

A damping coefficient switching-type hydraulic damper as defined in claims 8 and 9 of the present invention is characterized by providing a relief valve for limiting pressures in the hydraulic chambers at the opposite sides of the piston, wherein the on-off control valve maintains a closed state in such a manner as not to allow the hydraulic drive means for driving the on-off control valve to work with pressure equal to or higher than pressure for the relief valve to start working.

When the damping coefficient switching-type hydraulic damper comprising the on-off control valve having the hydraulic drive means as defined in claim 6 or 7 is provided with the relief valve for limiting the pressures in the left- and right-side hydraulic chambers, for instance, pressure equal to or higher than a relief load $F_R$ is not necessarily enough to maximize a load at the maximum point of amplitude, as shown in FIG. 15, and therefore, causes the on-off control valve to work at the maximum point of load (hydraulic pressure) shown by a point P, for instance, resulting in no attainment of a load-to-deformation relation shown in FIG. 15. Thus, the damping coefficient switching-type hydraulic damper as defined in claims 8 and 9 is structured so that the on-off control valve is not allowed to work with pressure equal to or higher than the relief load $F_R$ shown in FIG. 15, and thereby attains the load-to-deformation relation shown in FIG. 15 by allowing the on-off control valve to work with the pressure lower than the relief load $F_R$.

In the damping coefficient switching-type hydraulic damper as defined in claim 7, a damping coefficient switching-type hydraulic damper as defined in claim 10 of the present invention is characterized by providing a relief valve for respectively limiting pressures in the hydraulic chambers at the opposite sides of the piston, and a relief valve for limiting pressure in the buffer to pressure equal to or lower than pressure for the relief valve to start working so that the on-off control valve maintains a closed state in such a manner as not to allow the hydraulic drive means for driving the on-off control valve to work with pressure equal to or higher than the pressure for the relief valve to start working.

The damping coefficient switching-type hydraulic damper as defined in claim 10 is that having a specific structure required for a case where the hydraulic drive means is composed of the buffer and the selector valve as shown in FIGS. 8 to 10, for instance. Specifically, this hydraulic damper has a main relief valve 50 for relieving the pressure from each of the hydraulic chambers 4 and a relief valve 51 provided for each of the left- and right-side buffers 42 to relieve the pressure from each buffer to an outlet-side bypass passage 15, wherein the selector valve 43 is opened, the on-off control operation valve 11 is also opened and the flow regulating valve 10 is further opened only with the pressure equal to or lower than the pressure for the main relief valve 50 to start working in such a manner as to set the pressure in the relief valve 51 to be lower than the pressure for the main relief valve 50 to start working.

Specifically, in FIGS. 8 and 10, there are shown two main relief valves 50 respectively provided in passages communicating with the left- and right-side hydraulic chambers 4, 4. Alternatively, a single relief valve 50 may be provided between an outflow passage 13 and an outlet-side bypass passage 15 through a check valve so as to be placed in parallel to the flow regulating valve 10.

In the damping coefficient switching-type hydraulic damper as defined in claim 6, 7, 8, 9 or 10, a damping coefficient switching-type hydraulic damper as defined in claim 11 of the present invention is characterized by providing two sets of hydraulic drive means respectively for the hydraulic chambers at the opposite sides of the piston, wherein the single on-off control valve provided in common to the hydraulic chambers at the opposite sides of the piston is driven using these hydraulic drive means.

The damping coefficient switching-type hydraulic damper as defined in claim 11 is that of single valve type, wherein a single on-off control valve (flow regulating valve 10) is used, and also that employing two hydraulic drive means 40 as shown in FIGS. 5 and 8, for instance. Specifically, this hydraulic damper employs a hydraulic drive means 40 that is not allowed to work for the increasing hydraulic pressure but works in response to the decreasing hydraulic pressure. While the piston 3 is moving in the direction A, the hydraulic pressure in a left-side hydraulic chamber 4 increases, whereas a left-side on-off control operation valve 11 is closed to place a central flow regulating valve 10 (on-off control valve) in a closed state in such a manner as not to allow a left-side hydraulic drive means 40 to work for the increasing hydraulic pressure, and the first damping coefficient (maximum value Cmax) is attained. When the movement of the piston 3 is turned in the direction B at a left-side maximum point of amplitude, the hydraulic pressure begins to decrease, and therefore, the left-side hydraulic drive means 40 works to once open the left-side on-off control operation valve 11, which then allows the central flow regulating valve 10 to be once opened to perform elimination of a load, and the second damping coefficient (minimum value Cmin) is attained. When the piston 3 further moves in the direction B, the hydraulic pressure in a right-side hydraulic chamber 4 increases, and therefore, a right-side hydraulic drive means 40 works to close the flow regulating valve 10 again, and the second damping coefficient is returned to the first damping coefficient (maximum value Cmax). Similar working to the above is also applied to a right-side maximum point of amplitude, and the above operations are performed repeatedly. When the drive means is of hydraulic type as described above, it is also noted that the on-off control operation valve 11 of the flow regulating valve 10 may be used independently as the on-off control valve when the flow rate is not so high.

In the damping coefficient-switching type hydraulic damper as defined in claim 6, 7, 8, 9 or 10, a damping coefficient switching-type hydraulic damper as defined in claim 12 of the present invention is characterized by providing two sets of on-off control valves and hydraulic drive means respectively for the hydraulic chambers at the opposite sides of the piston.

The damping coefficient switching-type hydraulic damper as defined in claim 12 is that of two valve type, wherein two on-off control valves are used, and also that employing two hydraulic drive means 40, as shown in FIGS. 6 and 9, for instance. Specifically, this hydraulic damper employs the hydraulic drive means 40 similar to that in FIG. 5. While the piston 3 is moving in the direction A, the hydraulic pressure in the left-side hydraulic chamber 4 increases, whereas the on-off control operation valve 11 and the flow regulating valve 10 (on-off control valve) are placed in a closed state in such a manner as not to allow the left-side hydraulic drive means 40 to work for the increasing hydraulic pressure, and the first damping coefficient (maximum value Cmax) is attained. When the movement of the piston 3 is turned in the direction B at a left-side maximum point of amplitude, the hydraulic pressure begins to decrease, and therefore, the left-side hydraulic drive means 40 works to once open the on-off control operation valve 11 and the flow regulating valve 10 on the left side to perform elimination of a load, and the second damping coefficient (minimum value Cmin) is attained. When the piston 3 further moves in the direction B, the hydraulic pressure in the right-side hydraulic chamber 4 increases, and therefore, the right-side hydraulic drive means 40 works to close the on-off control operation valve 11 and the flow regulating valve 10 on the right side, and the second damping coefficient is returned to the first damping coefficient (maximum value Cmax). Similar working to the above is also applied to a right-side maximum point of amplitude, and the above operations are performed repeatedly. When the drive means is of hydraulic type as described above, it is also noted that the on-off control operation valve 11 of the flow regulating valve 10 may be used independently as the on-off control valve when the flow rate is not so high.

In the damping coefficient switching-type hydraulic damper as defined in claim 6, 7, 8, 9 or 10, a damping coefficient switching-type hydraulic damper as defined in claim 13 is characterized by providing a set of on-off control valve and hydraulic drive means in common to the hydraulic chambers at the opposite sides of the piston.

The damping coefficient switching-type hydraulic damper as defined in claim 13 is that of single valve type, wherein a single on-off control valve (flow regulating valve) 10 is used, and also that employing a single hydraulic drive means 40 as shown in FIGS. 7 and 10, for instance. Specifically, this hydraulic damper employs the hydraulic drive means 40 similar to that in FIG. 5. While the piston 3 is moving in the direction A, the hydraulic pressure in the left-side hydraulic chamber 4 increases, whereas the on-off control operation valve 11 and the flow regulating valve 10 (on-off control valve) are placed in the closed state in such a manner as not to allow the hydraulic drive means to work for the increasing hydraulic pressure, and the first damping coefficient (maximum value Cmax) is attained. When the movement of the piston 3 is turned in the direction B at a left-side maximum point of amplitude, the hydraulic pressure begins to decrease, and therefore, the hydraulic drive means 40 works to once open the on-off control operation valve 11, which then allows the flow regulating valve 10 to be once opened to perform elimination of a load, and the second damping coefficient (Cmin) is attained. When the piston 3 further moves in the direction B, the hydraulic pressure in the right-side hydraulic chamber 4 increases, and therefore, the hydraulic drive means 40 works to close the on-off control operation valve 11 again, which then allows the flow regulating valve 10 to be closed again and the second damping coefficient is returned to the first damping coefficient (maximum value Cmax). Similar working to the above is also applied to a right-side maximum point of amplitude, and the above operations are performed repeatedly. When the drive means is of hydraulic type as described above, it is also noted that the on-off control operation valve 11 of the flow regulating valve 10 may be used independently as the on-off control valve when the flow rate is not so high.

The hydraulic damper having the above structure controls directly the on-off control valve of the hydraulic damper so as to be switched in such a manner as to convert the movement of the piston of the hydraulic damper and/or the change of pressure in response to vibrations and/or external forces such as earthquake and wind using the mechanical or hydraulic drive means. Thus, the hydraulic damper having the above structure enables automatic switching of the damping coefficient without needing the supply of energy from the outside at all, eliminates the need for the sensor, the controller, the electromagnetic valve or the like as well as the uninterruptible power supply unit and the special-purpose power supply wiring or the like, and as a result, may exert always surely the energy absorption capacity greater than that of the typical hydraulic damper.

BEST MODE FOR CARRYING OUT THE INVENTION

Figure 1:
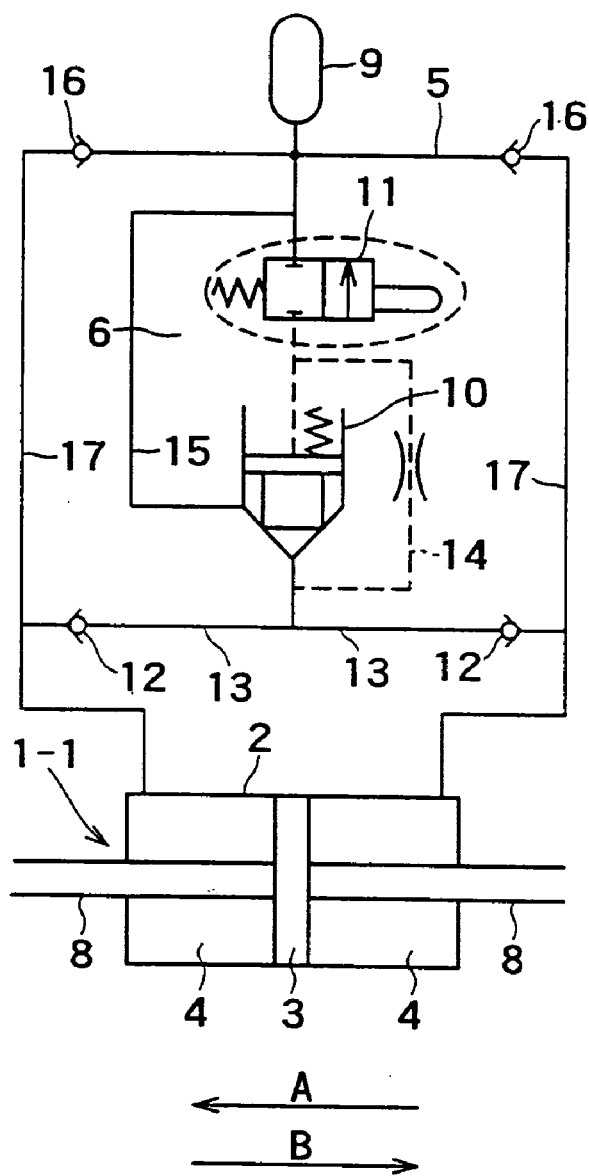
FIG. 1 is a hydraulic circuit diagram in accordance with the present invention.
Figure 2:
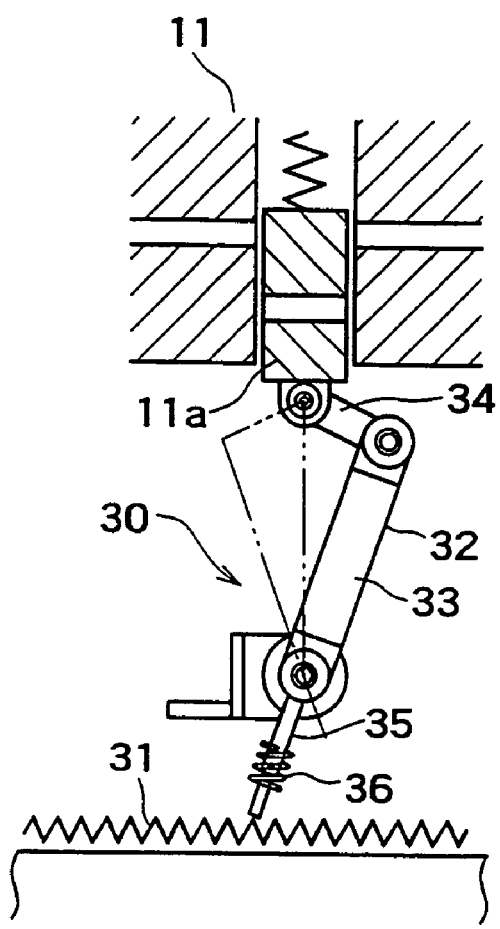
FIG. 2 is a side view showing a drive mechanism of a valve of the first embodiment that performs switching of a damping coefficient of a damping coefficient switching-type hydraulic damper according to the present invention in a mechanical manner.
Figure 3:
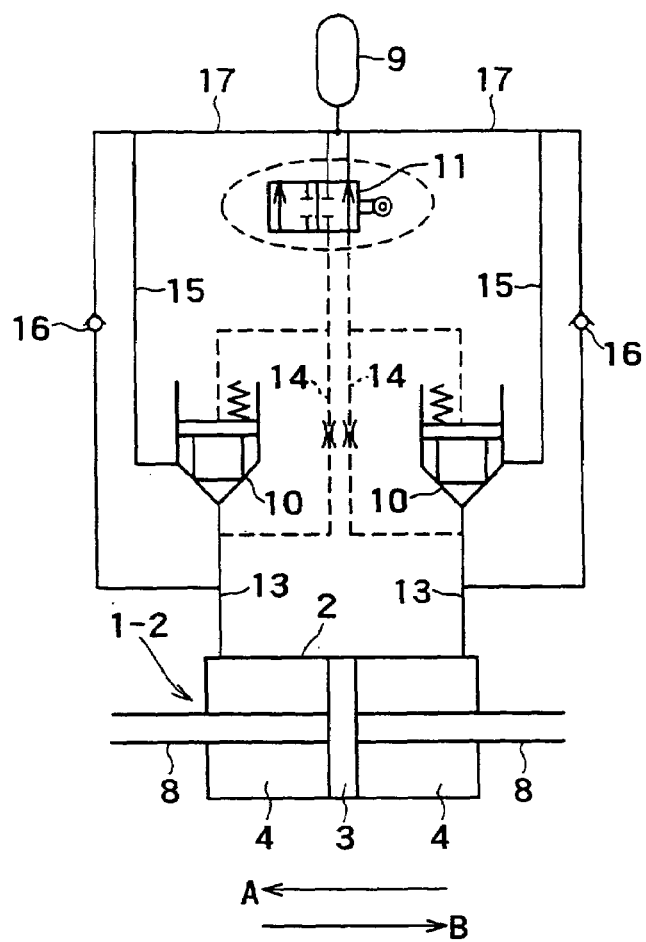
FIG. 3 is a hydraulic circuit diagram of a second embodiment that performs switching of a damping coefficient of a damping coefficient switching-type hydraulic damper according to the present invention in a mechanical manner.
Figure 4:
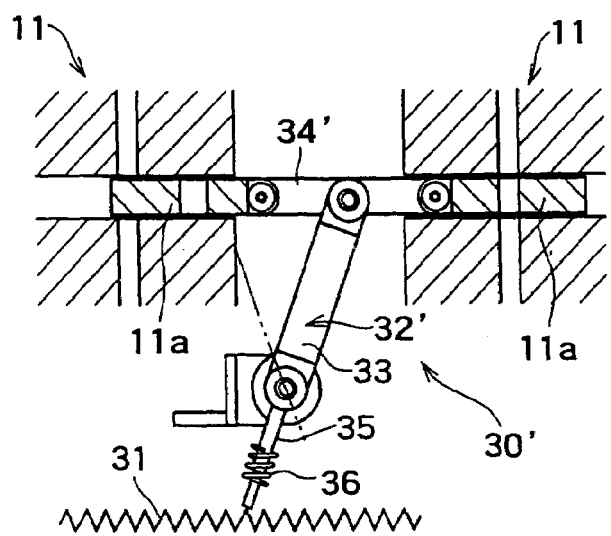
FIG. 4 is a side view showing a drive mechanism of a valve of the first embodiment.
Figure 5:
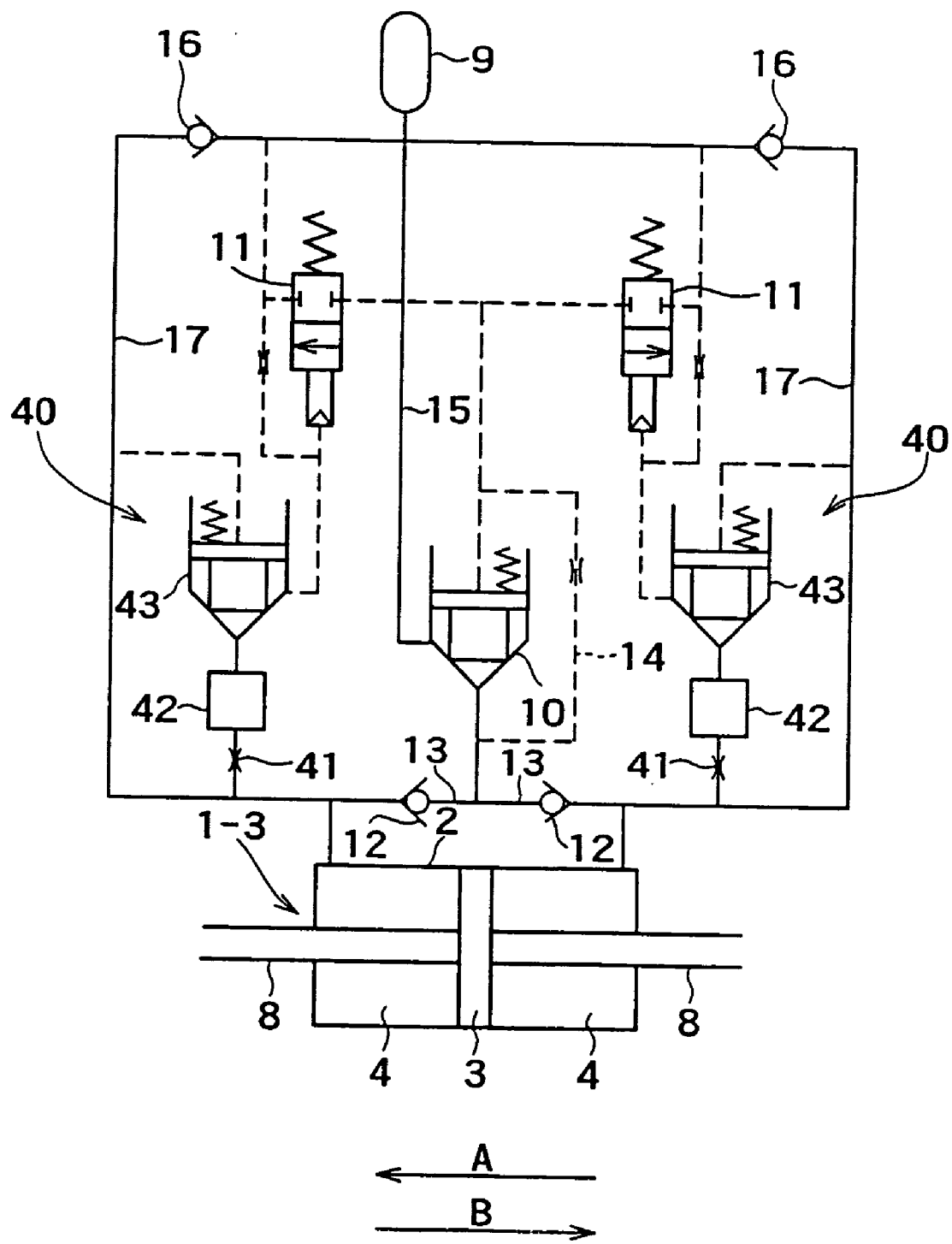
FIG. 5 is a hydraulic circuit diagram of a third embodiment that performs switching of a damping coefficient of a damping coefficient switching-type hydraulic damper according to the present invention in a hydraulic manner.
Figure 6:
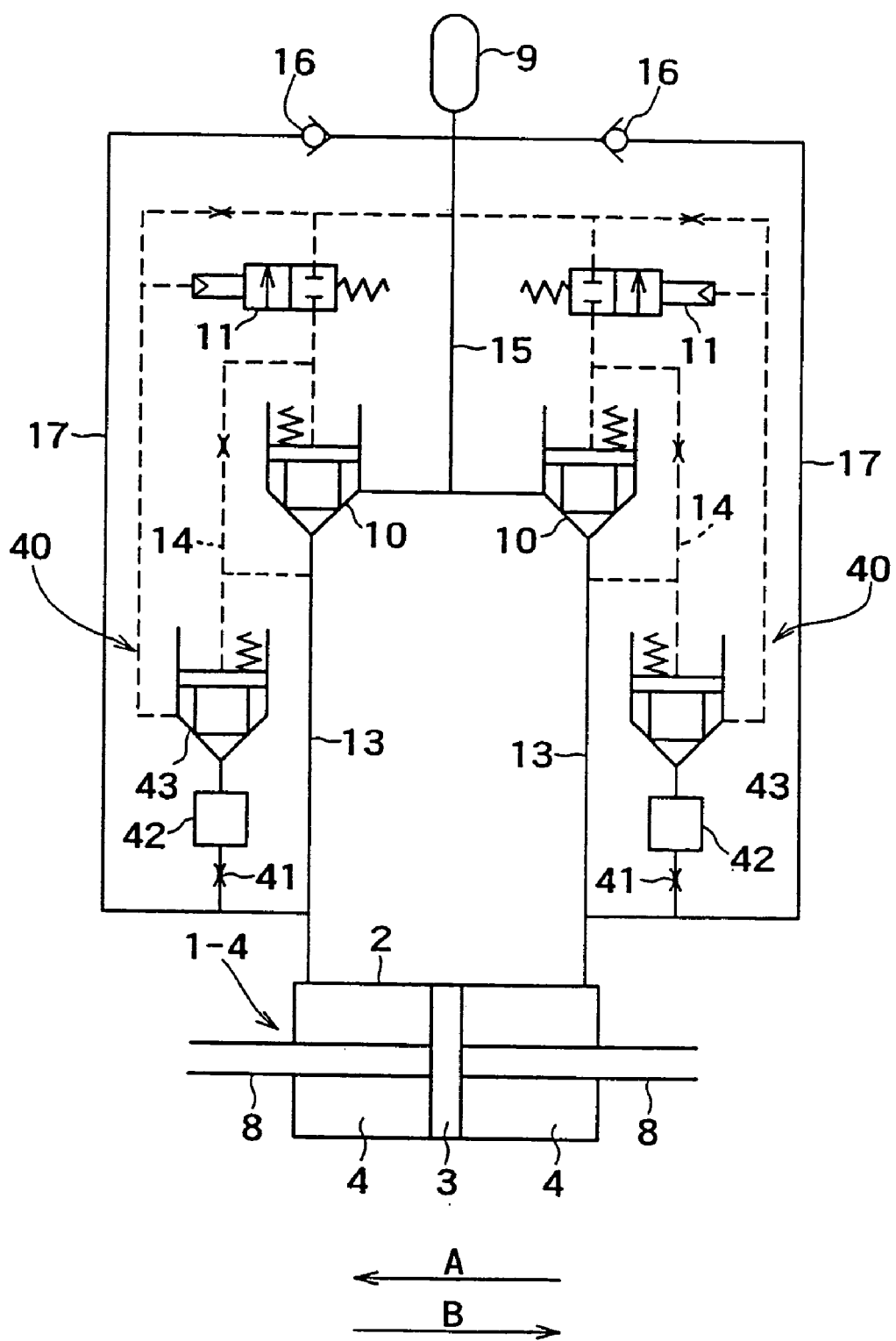
FIG. 6 is a hydraulic circuit diagram of a fourth embodiment that performs switching of a damping coefficient of a damping coefficient switching-type hydraulic damper according to the present invention in a hydraulic manner.
Figure 7:
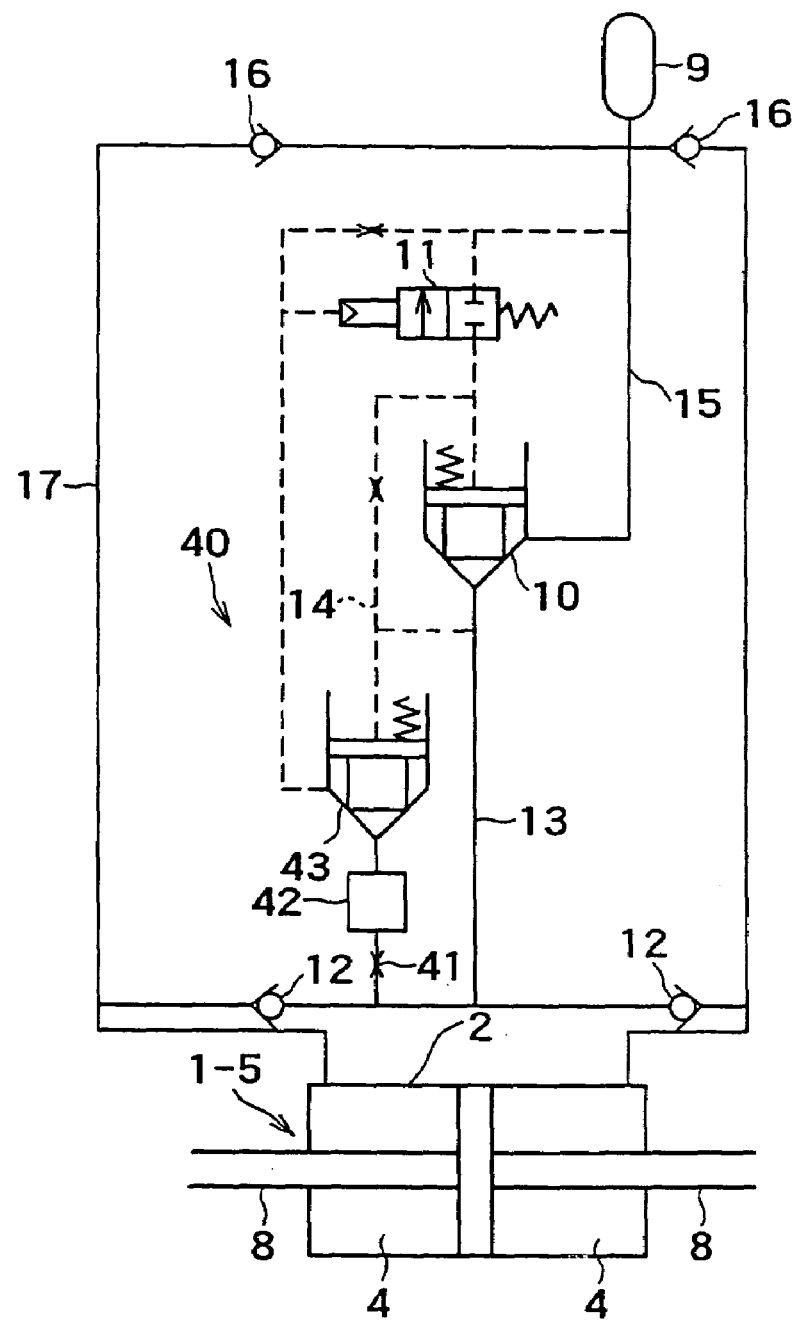
FIG. 7 is a hydraulic circuit diagram of a fifth embodiment that performs switching of a damping coefficient of a damping coefficient switching-type hydraulic damper according to the present invention in a hydraulic manner.

Hereinafter, the present invention will be described on the basis of illustrated embodiments. These embodiments are those using, for a hydraulic circuit of a hydraulic damper, a flow regulating valve that allows a large capacity of pressure oil to be passed at high rate and also to be blocked instantly. FIGS. 1 and 2 show a first embodiment that performs switching of a damping coefficient of a hydraulic damper in a mechanical manner, and FIGS. 3 and 4 show a second embodiment that employs a mechanical manner. FIGS. 5, 6 and 7 respectively show third, fourth and fifth embodiments that perform switching of the damping coefficient in a hydraulic manner.

(1) Mechanical Type of Damping Coefficient Switching-Type Hydraulic Damper (of Single Valve Type) 1-1

As shown in FIG. 1, a hydraulic damper 1 is composed of a cylinder 2, a double rod-type piston 3, hydraulic chambers 4, 4 at the opposite sides of the piston 3 and an on-off control valve 6 provided in a passage 5 for connecting both the hydraulic chambers together, like the conventional hydraulic damper. In the present embodiment, the on-off control valve 6 is a flow regulating valve (poppet valve) 10 adapted for a high flow rate, and an on-off control operation valve (pilot valve) 11 for on-off controlling the flow regulating valve 10 is connected to the flow regulating valve 10. The on-off control operation valve 11 is a two-position selector valve having an open position and a closed position. In addition, the hydraulic circuit also has an accumulator 9 for compensating for a change of volume or the like caused by compression and/or temperature change of a hydraulic fluid.

When the piston 3 moves in a direction A (to a left side) with the on-off control operation valve 11 closed, pressure oil in the left-side hydraulic chamber 4 acts on a back face of a valve body of the flow regulating valve 10 through a left-side check valve 12, an outflow passage 13 and an inlet-side bypass passage 14 having a restriction. Then, the flow regulating valve 10 is closed in response to the increasing back pressure thereof. Thereby, a damping coefficient of the hydraulic damper 1 is switched to a maximum value Cmax.

Subsequently, when the on-off control operation valve 11 is opened at a maximum point of amplitude, the back pressure of the flow regulating valve 10 is decreased to open the flow regulating valve 10, which then allows pressure oil to flow from the left-side hydraulic chamber 4 into the right-side hydraulic chamber 4 through the left-side check valve 12, the outflow passage 13, the flow regulating valve 10 in an opened state, an outlet-side bypass passage 15, a right-side check valve 16 and an inflow passage 17. Thus, the flow of the pressure oil as described above allows a load to be eliminated, so that the damping coefficient of the hydraulic damper 1 is switched to a minimum value Cmin.

When the piston 3 moves in a direction B (to a right side), the above operations are also performed in a symmetrical manner. Thus, seismic response control is attained with repetition of the above operations (See a solid line $D_1$ in FIG. 14).

In thus-structured hydraulic damper 1, the first embodiment employs a mechanical drive means 30, as shown in FIG. 2, to allow the damping coefficient of the hydraulic damper 1 to be switched in two stages, that is, between the maximum value Cmax and the minimum value Cmin only with the hydraulic damper 1 that works in response to an external force.

The mechanical drive means 30 is composed of, for instance, a straight gear (rack) 31 fixed to a piston rod 8 and a crank mechanism 32 that works with the straight gear 31 to on-off control the on-off control operation valve 11. The crank mechanism 32 is structured so that a base part of a first link 33 is fixed to a cylinder side through a pin or the like to make the crank mechanism swing-able in a direction of movement of the piston, and a tip end of a second link 34 is connected to a valve body 11a of a spool or the like of the on-off control operation valve 11 through a pin or the like.

In addition, the first link 33 has at the base end thereof a slide rod 35 projecting toward the straight gear 31. The slide rod 35 is a double rod having a tip end rod that is housed in such a manner as to be movable forward and backward in an axial direction to a base end rod. The slide rod 35 is structured so that the tip end rod is pressed against the straight gear 31 by the action of a spring 36.

Thus-structured crank mechanism 33 is set so that the first link 33 is tilted backward in the direction B with respect to the straight gear 31. With the crank mechanism 32 set as described above, a port of the on-off control operation valve 11 is placed to be in misalignment, and the valve body 11a is held in a closed position. When the piston rod 8 moves in the direction A with the valve body 11a held in the closed position, the slide rod 35 slides on the straight gear 31 in such a manner that the tip end rod only moves forward and backward in accordance with convex and concave tooth parts of the straight gear 31, so that the first link 33 maintains the backward tilting position, and the on-off control operation valve 11 is held in a closed state.

When a direction of movement of the piston rod 8 is turned at the maximum point of amplitude so that the piston rod 8 moves in the direction B, the tip end rod of the slide rod 35 is pressed against the straight gear 31 by the action of the spring 36 and then becomes engaged with a tooth side face of the straight gear 31, and the first link 33 is tilted in the direction A to such a degree that the first link 33 and the second link 34 are aligned with each other. Then, the links 33, 34 aligned with each other push up the valve body 11a of the on-off control operation valve 11 to allow the port to be set in position, so that the on-off control operation valve 11 is switched to an opened state.

When the piston rod 8 further moves in the direction B, the first link 33 is tilted in the direction A, and then, the on-off control operation valve 11 is switched to the closed state again. With the on-off control operation valve 11 closed, the slide rod 35 slides on the straight gear 31 in a similar manner to the above, so that the on-off control operation valve 11 is held in the closed state.

Figure 9:
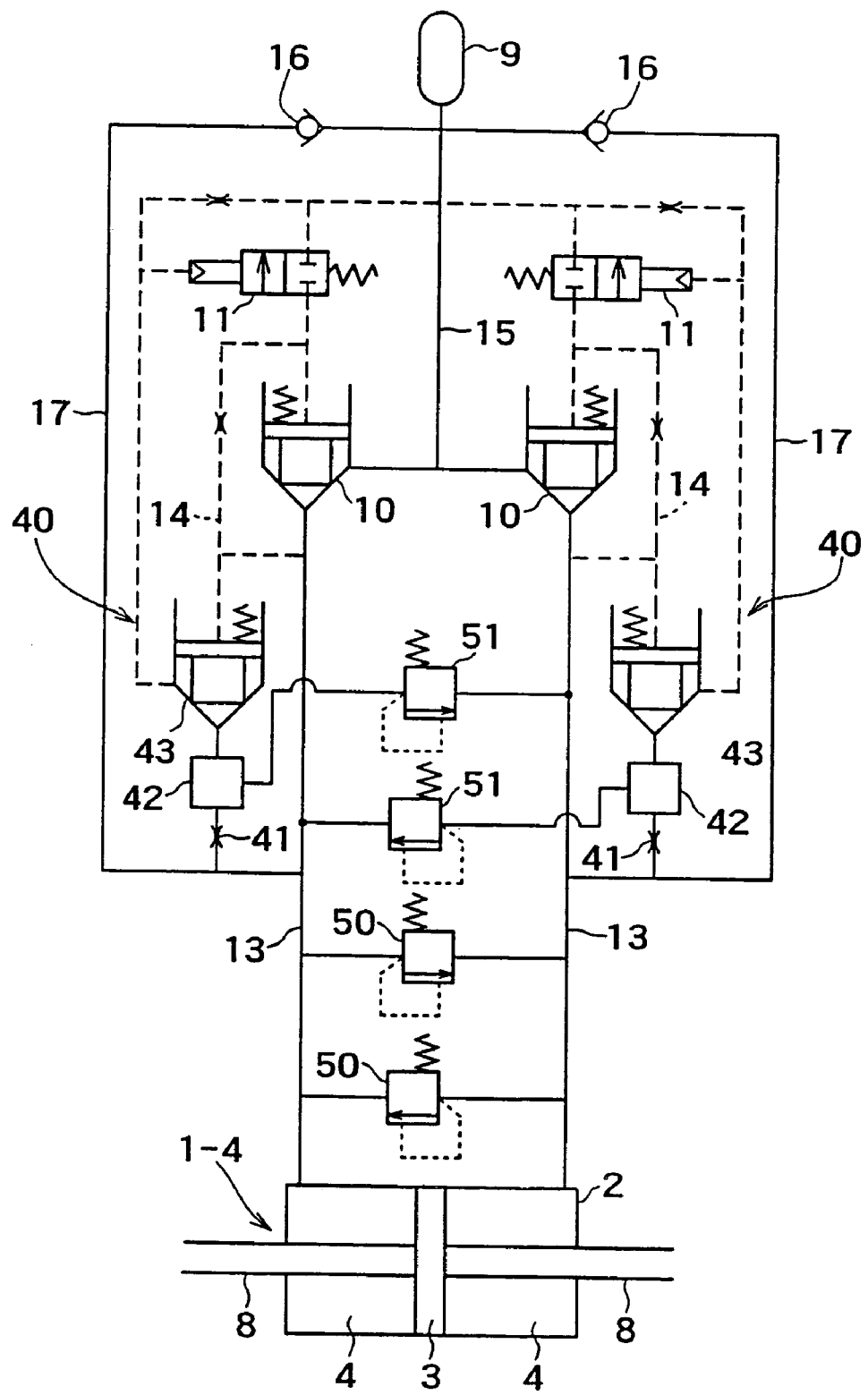
FIG. 9 is a hydraulic circuit diagram showing an embodiment, in which a relief valve is provided for the fourth embodiment of FIG. 6.

The mechanical type of damping coefficient switching-type hydraulic damper 1-1 having the above structure operates as follows, when incorporated into a column-and-beam frame of a building through a brace as shown in FIG. 9, for instance.

(1) When the piston rod 8 moves in the direction A from the state of FIG. 1 in response to an earthquake or the like, the crank mechanism 32 slides on the straight gear 31 without working, and therefore, the on-off control operation valve 11 maintains the closed state, which then allows also the flow regulating valve 10 to maintain the closed state, so that the damping coefficient is switched to the maximum value Cmax. Thus, seismic response control is attained with this damping coefficient Cmax.

(2) When the direction of movement of the piston rod 8 is turned at a left-side maximum point of amplitude so that the piston rod 8 moves in the direction B, the crank mechanism 32 works to align the links with each other. Then, the links aligned as described above push up the valve body 11a of the on-off control operation valve 11 to open the on-off control operation valve 11, which then allows also the flow regulating valve 10 to be switched to the opened state to flow the pressure oil from the left-side hydraulic chamber 4 to the right-side hydraulic chamber 4. Thus, the flow of the pressure oil as described above allows a load to be once eliminated, so that the damping coefficient is switched to the minimum value Cmin.

(3) When the piston rod 8 further moves in the direction B, the crank mechanism 32 works in the opposite direction so as to be tilted in the direction A, and therefore, the on-off control operation valve 11 is closed again, which then allows also the flow regulating valve 10 to be closed again, so that the damping coefficient is returned to the maximum value Cmax.

(4) The crank mechanism 32 in this state slides on the straight gear 31 without working, and therefore, the on-off control operation valve 11 maintains the closed state, so that the damping coefficient may be switched to the maximum value Cmax for the movement in the direction B.

Figure 14:
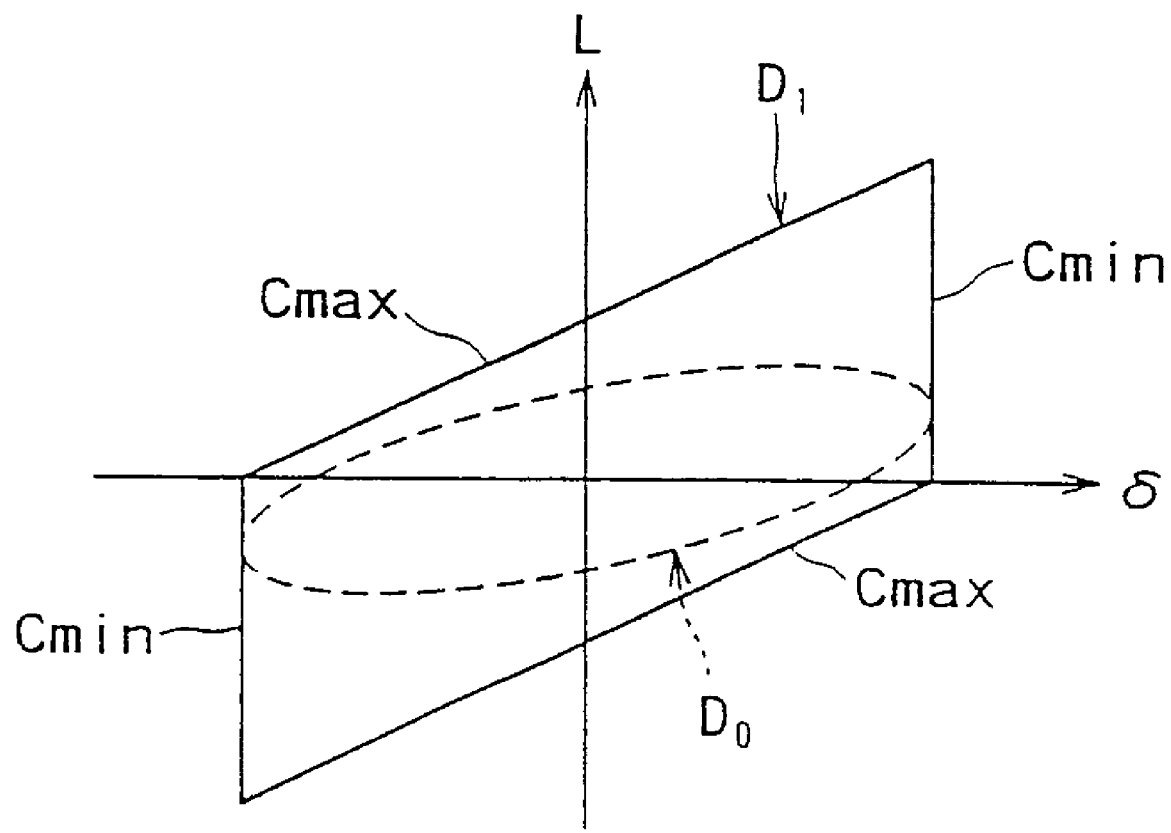
FIG. 14 is a graph showing a load-to-deformation relation of a hydraulic damper for seismic response control.

(5) Repeating the above operations at the opposite sides of the cylinder allows the energy absorption capacity to be substantially upgraded as shown by a solid line $D_1$ in FIG. 14, as compared with a typical hydraulic damper $D_0$ whose damping coefficient is constant. In addition, the damping coefficient may be automatically switched only with the movement of the piston in response to the vibrations and/or external forces such as earthquake.

Although the embodiment employing the flow regulating valve 10 has been described, it is noted that the mere use of the on-off control operation valve 11 is enough to perform switching of the damping coefficient without using the flow regulating valve 10, when the flow rate is not so high.

[II] Mechanical Type of Damping Coefficient Switching-Type Hydraulic Damper (of Two Valve Type) 1-2

As shown in FIG. 3, this embodiment is that having the flow regulating valve (poppet valve) 10 and the on-off control operation valve (pilot valve) 11 individually provided for the left- and right-side hydraulic chambers 4, 4. The hydraulic damper in this embodiment allows the on-off control operation valve 11 and the flow regulating valve 10 respectively connected to the hydraulic chambers 4, 4 to be on-off controlled individually.

Like the embodiment shown in FIG. 1, the flow regulating valve 10 is on-off controlled using the on-off control operation valve 11. Two on-off control operation valves 11 are used as left- and right-side on-off control operation valves, and on-off controlled using a mechanical drive means 30' similar to that in FIG. 1.

As shown in FIG. 4, the mechanical drive means 30' is composed of a straight gear (rack) 31 and a link mechanism 32'. The link mechanism 32' has a first line 33 and a second line 34'. The first line 33 has the same structure as that of FIG. 2, while the second link 34' is structured so that an intermediate part thereof is mounted to a tip end of the first link 33 through a pin or the like, and the valve bodies 11a of the left- and right-side on-off control valves 11 are connected to the opposite ends of the second link through pins or the like.

Thus-structured link mechanism 32' is set so that the first link 33 is tilted backward in the direction B with respect to the straight gear 31, like the embodiment of FIG. 2. With the link mechanism 32' set as described above, the left-side on-off control operation valve 11 is held in the closed position, while the right-side on-off control operation valve 11 is held in the opened position. Even when the piston rod 8 moves in the direction A from this state, the slide rod 35 slides on the straight gear 31, like the embodiment of FIG. 2, so that the first link 33 maintains the backward tilting position, and the left- and right-side on-off control operation valves 11, 11 are held in their respective states.

When the direction of movement of the piston rod 8 is turned at the maximum point of amplitude so that the piston rod 8 moves in the direction B, the first link 33 is tilted in the direction A thanks to the tooth side face of the straight gear 31, like the embodiment of FIG. 2, and both of the valve bodies 11a of the left- and right-side on-off control operation valves 11 move together in a horizontal direction, so that the left-side on-off control operation valve 11 is switched to the opened state, while the right-side on-off control operation valve 11 is switched to the closed state. Even when the piston rod 8 further moves in the direction B, the slide rod 35 slides on the straight gear 31, so that the left-side on-off control operation valve 11 is held in the opened state, while the right-side on-off control operation valve 11 is held in the closed state.

The mechanical type of damping coefficient switching-type hydraulic damper 1-2 having the above structure operates as follows.

(1) When the piston rod 8 moves in the direction A from the state of FIG. 3 in response to an earthquake or the like, the link mechanism 32' slides on the straight gear 31 without working, and therefore, the left-side on-off control operation valve 11 maintains the closed state, which then allows also the left-side flow regulating valve 10 to maintain the closed state, so that the damping coefficient is switched to the maximum value Cmax. Thus, seismic response control is attained with this damping coefficient Cmax.

(2) When the direction of movement of the piston rod 8 is turned at the left-side maximum point of amplitude so that the piston rod 8 moves in the direction B, the link mechanism 32' works to open the left-side on-off control operation valve 11, which then allows also the left-side flow regulating valve 10 to be switched to the opened state to flow pressure oil from the left-side hydraulic chamber 4 to the right-side hydraulic chamber 4. Thus, the flow of the pressure oil as described above allows a load to be once eliminated, so that the damping coefficient is switched to the minimum value Cmin.

(3) At this time, the right-side on-off control operation valve 11 is placed in the closed state, and the link mechanism 32' slides on the straight gear 31 without working for the further movement of the piston rod 8 in the direction B, and therefore, the right-side on-off control operation valve 11 maintains the closed state, which then allows also the right-side flow regulating valve 10 to maintain the closed state, so that the damping coefficient is returned to the maximum value Cmax.

(4) Repeating the above operations at the opposite sides of the cylinder allows the energy absorption capacity to be substantially upgraded as shown in FIG. 14, as compared with the typical hydraulic damper whose damping coefficient is constant. In addition, the damping coefficient may be automatically switched only with the movement of the piston in response to the vibrations and/or external forces such as earthquake.

In the case of the above second embodiment, it is also noted that the mere use of the on-off control operation valve 11 is enough to perform switching of the damping coefficient without using the flow regulating valve 10, when the flow rate is not so high.

[III] Hydraulic Type of Damping Coefficient Switching-Type Hydraulic Damper (of Single Valve and Two Drive Part Type) 1-3

As shown in FIG. 5, in place of the mechanical drive means 30 of FIG. 2, a hydraulic drive means 40 is incorporated in the hydraulic circuit of FIG. 1 to perform switching of the damping coefficient with a change of hydraulic pressure.

The hydraulic drive means 40 is composed of a buffer 42 connected to each of inflow passages 17, 17 of the hydraulic chambers 4,4 through restrictions respectively and being used for storing pressure oil, and a selector valve (poppet valve) 43 connected to the buffer 42 and being used to on-off control the on-off control operation valve 11.

The selector valve 43 is of poppet valve type similarly to the flow regulating valve 10. Specifically, the selector valve 43 has an inlet port connected to the buffer 42 and a back pressure port communicating with the inflow passage 17, and supplies pressure oil as pilot pressure through an outlet port to the on-off control operation valve 11 to drive the valve body of the spool or the like of the on-off control operation valve 11.

Thus, when the pressure in the hydraulic chamber 4 increases, the pressure oil is stored in the buffer 42. However, in this case, high back pressure also acts on the selector valve 43 through the inflow passage 17, and the selector valve 43 is closed to prevent the pressure oil from acting as the pilot pressure on the on-off control operation valve 11 through the outlet port of the selector valve 43, so that the on-off control operation valve 11 is held in the closed state. When the pressure in the hydraulic chamber 4 begins to decrease, the back pressure in the selector valve 43 also becomes lower than the pressure in the buffer 42 to open the selector valve 43, which then allows the pressure oil supplied through the outlet port of the selector valve 43 to act as pilot pressure on the on-off control operation valve 11, so that the on-off control operation valve 11 is opened.

The hydraulic type of damping coefficient switching-type hydraulic-damper 1-3 having the above structure operates as follows.

(1) When the piston rod 8 moves in the direction A from the state of FIG. 5 in response to an earthquake or the like, the pressure in the left-side hydraulic chamber 4 increases to close the left-side selector valve 43 as described above, and therefore, the left-side on-off control operation valve 11 maintains the closed state, which then allows also the central flow regulating valve 10 to maintain the closed state, so that the damping coefficient is switched to the maximum value Cmax. Thus, seismic response control is attained with this damping coefficient Cmax.

(2) When the direction of movement of the piston rod 8 is turned at the left-side maximum point of amplitude so that the piston rod 8 moves in the direction B, the pressure in the left-side hydraulic chamber 4 begins to decrease to open the left-side selector valve 43 as described above, and therefore, the left-side on-off control operation valve 1 is opened, which then allows also the central flow regulating valve to be opened to flow the pressure oil from the left-side hydraulic chamber 4 to the right-side hydraulic chamber 4 through the flow regulating valve 10. Thus, the flow of the pressure oil as described above allows a load to be once eliminated, so that the damping coefficient is switched to the minimum value Cmin.

(3) When the piston rod 8 further moves in the direction B, the buffer 42, the selector valve 43 and the on-off control operation valve 11 on the right side work in a similar manner to the above, and therefore, the central flow regulating valve 10 is opened, so that the damping coefficient is returned to the maximum value Cmax.

(4) Repeating the above operations at the opposite sides of the piston allows the energy absorption capacity to be substantially upgraded as shown in FIG. 14, as compared with the typical hydraulic damper whose damping coefficient is constant. In addition, the damping coefficient may be automatically switched only with the movement of the piston in response to the vibrations and/or external forces such as earthquake.

Although there are provided two on-off control operation valves 11, it is noted that the use of the single on-off control operation valve will do. In the case of the above third embodiment, it is also noted that the mere use of the on-off control operation valve 11 is enough to perform switching of the damping coefficient without using the flow regulating valve 10, when the flow rate is not so high.

[IV] Hydraulic-Type Damping Coefficient Switching-Type Hydraulic Damper (of Two Valve and Two Drive Part Type) 1-4

As shown in FIG. 6, this embodiment is that employing two flow regulating valves 10 arranged as right- and left-side flow regulating valves in the hydraulic circuit of FIG. 5. This embodiment is similar in other constitution to that of FIG. 5.

The hydraulic type of damping coefficient switching-type hydraulic damper 1-4 having the above structure operates as follows, like that of FIG. 5, except that the hydraulic damper 1-4 employs two flow regulating valves 10 unlike that of FIG. 3.

(1) When the piston rod 8 moves in the direction A from the state of FIG. 6 in response to an earthquake or the like, the pressure in the left-side hydraulic chamber 4 increases to close the left-side selector valve 43 as described above, and therefore, the left-side on-off control operation valve 11 maintains the closed state, which then allows also the left-side flow regulating valve 10 to maintain the closed state, so that the damping coefficient is switched to the maximum value Cmax. Thus, seismic response control is attained with this damping coefficient Cmax.

(2) When the direction of movement of the piston rod 8 is turned so that the piston rod 8 moves in the direction B, the pressure in the left-side hydraulic chamber 4 begins to decrease to open the left-side selector valve 43 as described above, and therefore, the left-side on-off control operation valve 11 is opened, which then allows also the left-side flow regulating valve 10 to be opened to flow the pressure oil from the left-side hydraulic chamber 4 to the right-side hydraulic chamber 4 through the left-side flow regulating valve 10. Thus, the flow of the pressure oil as described above allows a load to be once eliminated, so that the damping coefficient is switched to the minimum value Cmin.

(3) When the piston rod 8 further moves in the direction B, the buffer 42, the selector valve 43 and the on-off control operation valve 11 on the right side work in a similar manner to the above, and therefore, the right-side flow regulating valve 10 is opened, so that the damping coefficient is returned to the maximum value Cmax.

(4) Repeating the above operations at the opposite sides of the cylinder allows the energy absorption capacity to be substantially upgraded as shown in FIG. 14, as compared with the typical hydraulic damper whose damping coefficient is constant. In addition, the damping coefficient may be automatically switched only with the movement of the piston in response to the vibrations and/or external forces such as earthquake.

In the case of the above fourth embodiment, it is also noted that the mere use of the on-off control operation valve 11 is enough to perform switching of the damping coefficient without using the flow regulating valve 10 when the flow rate is not so high.

[V] Hydraulic Type of Damping Coefficient Switching-Type Hydraulic Damper (of Single Valve and Single Drive Part Type) 1-5

As shown in FIG. 7, this embodiment is that employing a single hydraulic drive means 40 arranged in the hydraulic circuit of single valve type in FIG. 5. This embodiment is similar in other constitution to that of FIG. 5.

The hydraulic type of damping coefficient switching-type hydraulic damper 1-5 having the above structure operates as follows, like that of FIG. 5, except that the hydraulic damper 1-5 employs the single flow regulating valve 10 and the single hydraulic drive means 40 unlike that of FIG. 3.

(1) When the piston rod 8 moves in the direction A from the state of FIG. 7 in response to an earthquake or the like, the pressure in the left-side hydraulic chamber 4 increases to close the selector valve 43 as described above, and therefore, the on-off control operation valve 11 maintains the closed state, which then allows also the flow regulating valve 10 to maintain the closed state, so that the damping coefficient is switched to the maximum value Cmax. Thus, seismic response control is attained with this damping coefficient Cmax.

(2) When the direction of movement of the piston rod 8 is turned so that the piston rod 8 moves in the direction B, the pressure in the left-side hydraulic pressure begins to decrease to open the selector valve 43 as described above, and therefore, the on-off control operation valve 11 is opened, which then allows also the flow regulating valve 10 to be opened to flow the pressure oil in the hydraulic chamber 4 to the right-side hydraulic chamber 4 through the flow regulating valve 10. Thus, the flow of the pressure oil as described above allows a load to be once eliminated, so that the damping coefficient is switched to the minimum value Cmin.

(3) When the piston rod 8 further moves in the direction B, the buffer 42, the selector valve 43 and the on-off control operation valve 11 work in a similar manner to the above, and therefore, the flow regulating valve 10 is opened, so that the damping coefficient is returned to the maximum value Cmax.

(4) Repeating the above operations at the opposite sides of the cylinder allows the energy absorption capacity to be substantially upgraded as shown in FIG. 14, as compared with the typical hydraulic damper whose damping coefficient is constant. In addition, the damping coefficient may be automatically switched only with the movement of the piston in response to the vibrations and/or external forces such as earthquake.

In the case of the above fifth embodiment, it is also noted that the mere use of the on-off control operation valve 11 is enough to perform switching of the damping coefficient without using the flow regulating valve 10, when the flow rate is not so high.

[VI] Damping Coefficient Switching-Type Hydraulic Damper with Relief Valve

Figure 15:
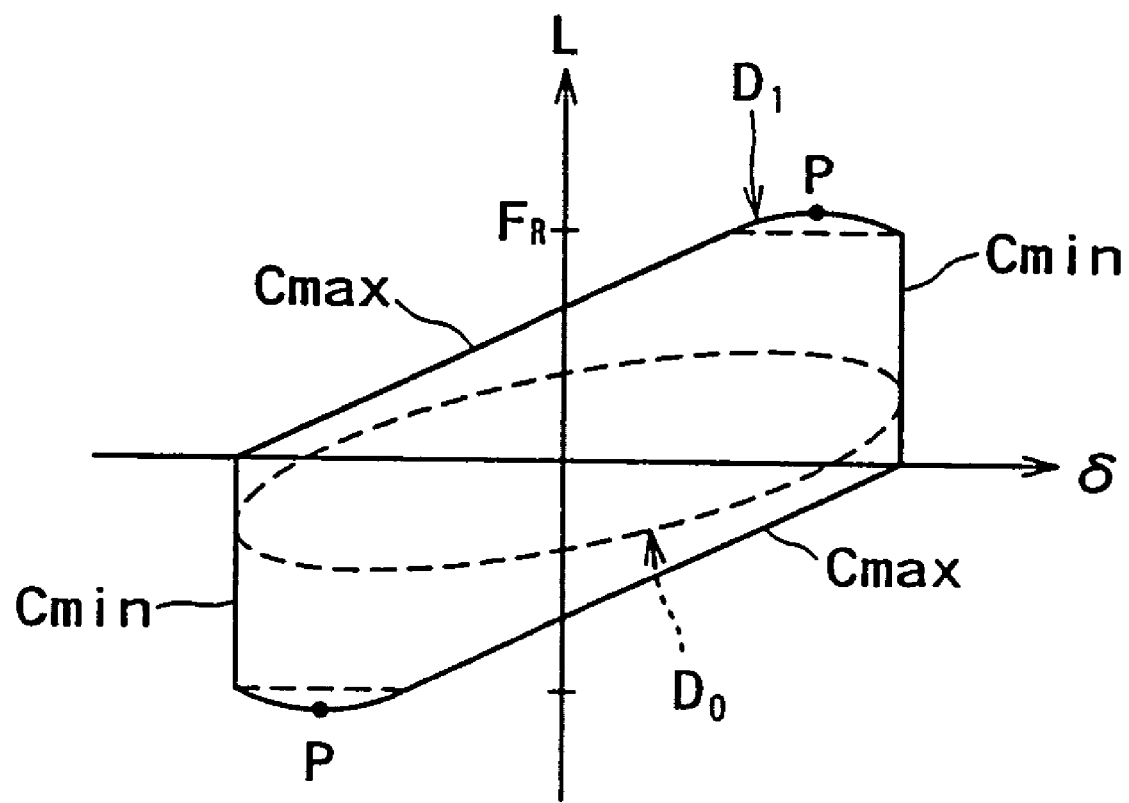
FIG. 15 is a graph showing a load-to-deformation relation of a hydraulic damper for seismic response control when the hydraulic damper has a relief valve.

In some cases, a relief valve for limiting pressures in the left- and right-side hydraulic chambers, for instance, is required to prevent a device from being broken due to an unexpected high load applied thereto. When the damping coefficient switching-type hydraulic damper comprising the on-off control operation valve having the mechanical drive means is provided with the relief valve, a load-to-deformation relation will be given as shown in a graph of FIG. 15. In FIG. 15, pressures are represented to be approximately constant at the relief load $F_R$. The hydraulic damper employing the drive means of mechanical type presents no problem, since a stroke end of the piston allows the on-off control valve to work, irrespectively of pressure.

On the contrary, when the damping coefficient switching-type hydraulic damper comprising the on-off control valve having the hydraulic drive means is provided with the relief valve, the pressure equal to or higher than the relief load $F_R$ is not necessarily enough to maximize a load at the maximum point of amplitude, and thereby causes the on-off control valve to work at the maximum point of load (hydraulic pressure) shown by a point P, for instance, resulting in no attainment of the load-to-deformation relation as shown in FIG. 15. In this connection, the hydraulic damper employing the drive means of hydraulic type is structured so that the on-off control valve is not allowed to work with the pressure equal to or higher than the relief load $F_R$ of FIG. 15, and thereby attains the load-to-deformation relation of FIG. 15 by allowing the on-off control valve to work with the pressure lower than the relief load $F_R$.

Figure 8:
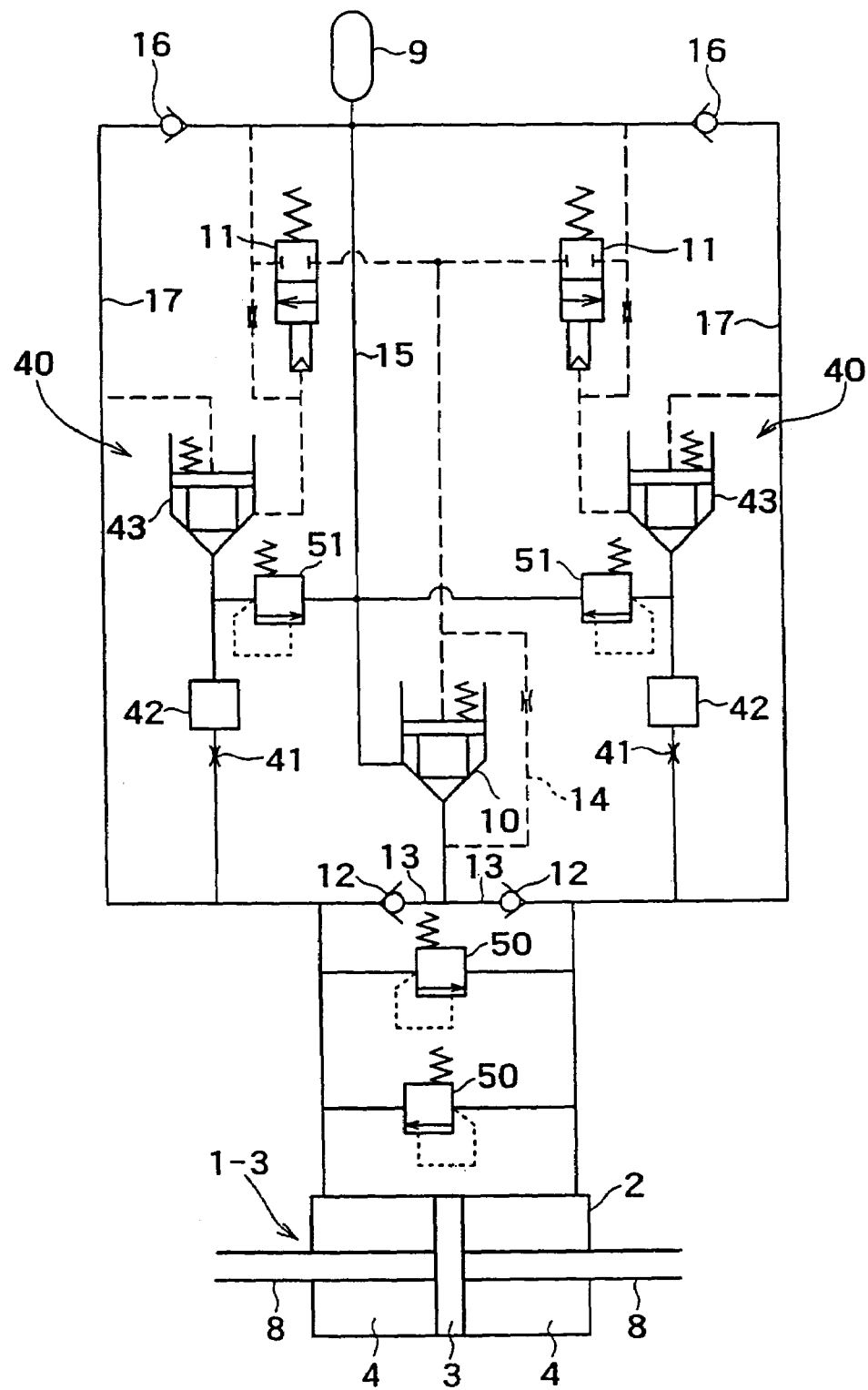
FIG. 8 is a hydraulic circuit diagram showing an embodiment, in which a relief valve is provided for the third embodiment of FIG. 5.
Figure 10:
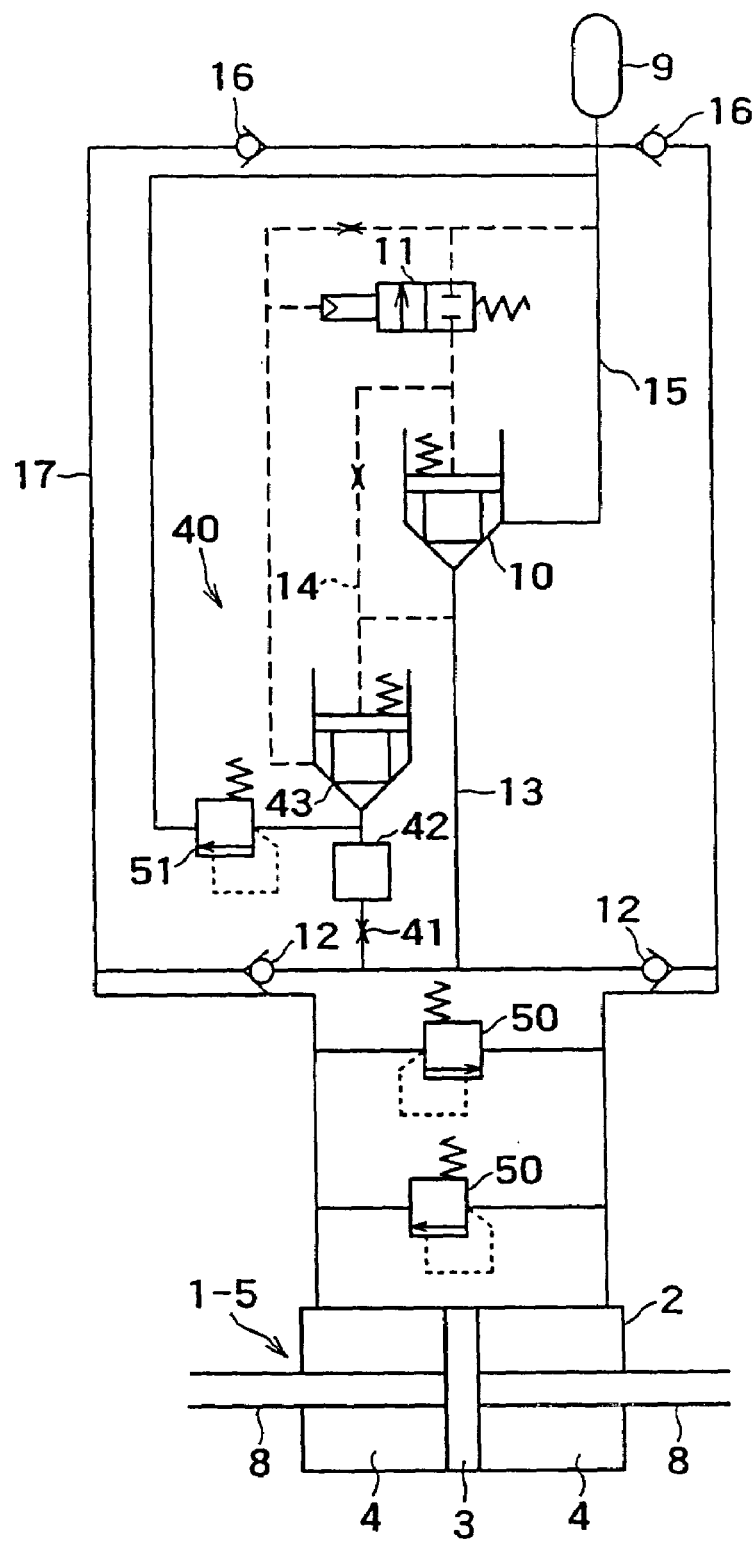
FIG. 10 is a hydraulic circuit diagram showing an embodiment, in which a relief valve is provided for the fifth embodiment of FIG. 7.
Figure 11:
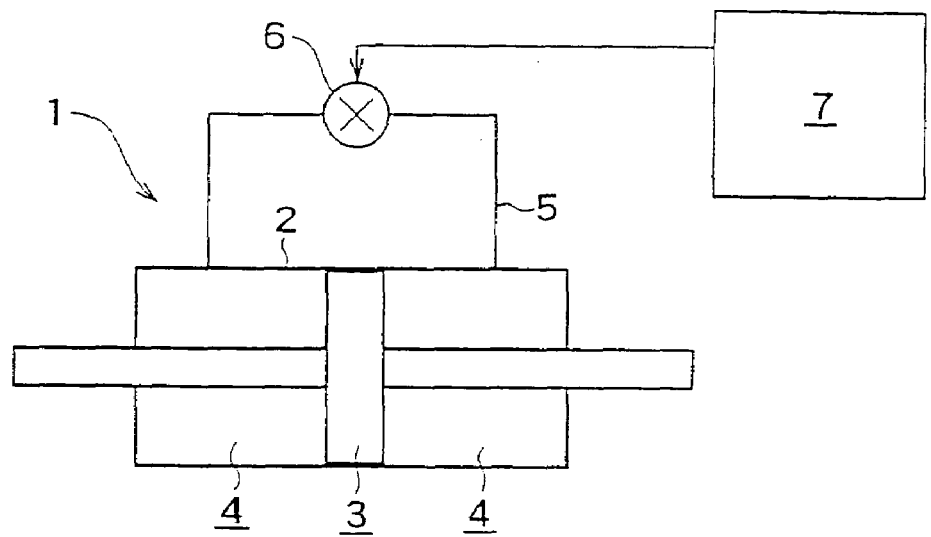
FIG. 11 is a schematic view showing a basic structure of a damping coefficient switching-type hydraulic damper.
Figures 12, 13:
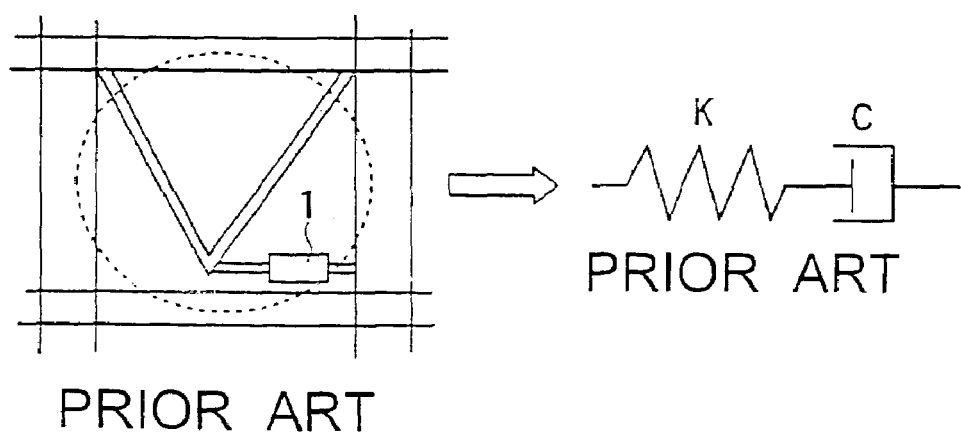
FIG. 12 is a front view showing an exemplified installation of a hydraulic damper for seismic response control.
FIG. 13 is a dynamic model diagram showing a hydraulic damper for seismic response control.

Specifically, a relief valve 51 for limiting the pressure in the buffer 42 is provided in addition to a main relief valve 50, as shown in FIGS. 8 to 10, and the pressure for the relief valve 51 to start working is set to be lower than pressure for the main relief valve 50 to work, thereby attaining the load-to-deformation relation of FIG. 15.

A damping coefficient switching-type hydraulic damper (of single valve and two drive part type) 1-3 shown in FIG. 8 is that having two passages communicating with the left- and right-side hydraulic chambers 4,4, the main relief valve 50 provided in each of the passages to relieve the pressure from each of the hydraulic chambers 4, and the relief valve 51 provided for each of the left- and right-side buffers 42 to relieve the pressure between the buffer 42 and the flow regulating valve 10 to the outlet-side bypass passage 15, wherein the selector valve 43 is opened, the on-off control operation valve 11 is also opened and the flow regulating valve 10 is further opened only with the pressure equal to or lower than the pressure for the main relief vale 50 to start working in such a manner as to set the pressure for the relief valve 51 to be lower than the pressure for the main relief valve 50 to start working.

A damping coefficient switching-type hydraulic damper (of two valve and two drive part type) 1-4 shown in FIG. 9, and a damping coefficient switching-type hydraulic damper (of single valve and single drive part type) 1-5 shown in FIG. 10 are also those having the main relief valve 50 and the relief valve 51 provided like the above hydraulic damper of FIG. 8 and also working in a similar manner to the above.

Although the embodiments (having the single flow regulating valve 10) shown in FIGS. 8 and 10 are provided with two main relief valves 50 in the passages communicating with the left- and right-side hydraulic chambers 4, 4, it is noted that a single relief valve 50 may be provided between the outflow passage 13 and the outlet-side bypass passage 15 through the check valve so as to be placed in parallel to the flow regulating valve 10.

The invention claimed is:

1. In a hydraulic damper having a cylinder, a piston movable in a reciprocating manner within said cylinder, hydraulic chambers provided at opposite sides of said piston, and an on-off control valve provided in a passage for connecting both said hydraulic chambers and being on-off controlled to change a damping coefficient, a damping coefficient switching-type hydraulic damper, characterized by providing a mechanical drive means, between a piston rod and said on-off control valve, said mechanical drive means structured so that a first damping coefficient is attained with said on-off control valve maintaining a closed state for movement of said piston in one direction, and a second damping coefficient is attained with said on-off control valve once opened at a time when the movement of said piston is turned in an opposite direction, and afterwards, is switched to the first damping coefficient with said on-off control valve closed again, said mechanical drive means being comprising a straight gear provided at the piston rod of said cylinder, and a crank mechanism that works with said straight gear to on-off control said on-off control valve.

2. The damping coefficient switching-type hydraulic damper according to claim 1, wherein said crank mechanism is composed of a first link provided to be slidable in a direction of movement of said piston, and a second link for connecting said first link with a valve body of said on-off control valve, and is structured so that said on-off control valve maintains the closed state when said crank mechanism stops working by sliding of an end rod of said first link on said straight gear at the time when said piston rod is moved in one direction, while said on-off control valve is opened when said crank mechanism works by engagement of the end rod of said first link with straight gear teeth at the time when the movement of said piston rod is turned in the opposite direction and said piston rod starts the movement in the opposite direction, and afterwards, is switched to the closed state again with said crank mechanism stopped working by the sliding of the end rod of said first link on said straight gear at the time when said piston rod is further moved.

3. The damping coefficient switching type hydraulic damper according to claim 2, wherein said hydraulic damper is structured so that pressures in the hydraulic chambers at the opposite sides of the piston are controlled using the on-off control valve.

* * * * *